United States Patent
Yegnashankaran et al.

(10) Patent No.: US 7,996,034 B1
(45) Date of Patent: Aug. 9, 2011

(54) CELLULAR TELEPHONE HANDSET WITH INCREASED RECEPTION SENSITIVITY AND REDUCED TRANSMIT POWER LEVELS

(75) Inventors: Visvamohan Yegnashankaran, Redwood City, CA (US); Ahmad Bahai, Lafayette, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1530 days.

(21) Appl. No.: 11/046,024

(22) Filed: Jan. 28, 2005

(51) Int. Cl.
*H04M 1/00* (2006.01)
*H04W 24/00* (2009.01)
(52) U.S. Cl. .............. 455/550.1; 455/456.1; 455/456.6
(58) Field of Classification Search ............... 445/550.1; 370/334
See application file for complete search history.

(56) References Cited

U.S. PATENT DOCUMENTS

| | | | | |
|---|---|---|---|---|
| 5,303,240 | A | * | 4/1994 | Borras et al. ................... 370/347 |
| 5,799,255 | A | * | 8/1998 | Berg et al. ...................... 455/551 |
| 5,949,369 | A | * | 9/1999 | Bradley et al. ................. 342/352 |
| 6,188,914 | B1 | * | 2/2001 | Chheda ....................... 455/562.1 |
| 6,281,841 | B1 | | 8/2001 | Nevill ........................... 342/424 |
| 6,499,698 | B2 | | 12/2002 | Maeda et al. ............. 244/158 R |
| 7,286,844 | B1 | * | 10/2007 | Redi et al. ...................... 455/522 |
| 2004/0157645 | A1 | * | 8/2004 | Smith et al. ................. 455/562.1 |
| 2004/0179551 | A1 | * | 9/2004 | Lentine et al. ................. 370/480 |
| 2005/0025099 | A1 | * | 2/2005 | Heath et al. .................... 370/334 |
| 2006/0152410 | A1 | * | 7/2006 | Shi ................................ 342/359 |
| 2008/0280624 | A1 | * | 11/2008 | Wrappe ...................... 455/456.1 |
| 2009/0111381 | A1 | * | 4/2009 | Johnson et al. ............... 455/63.4 |

* cited by examiner

*Primary Examiner* — Michael T Thier
(74) *Attorney, Agent, or Firm* — Mark C. Pickering (57) ABSTRACT

A cellular telephone handset utilizes an electrically-steered directional antenna to increase the received signal strength when the handset is in a poor signal environment. As a result, the handset reduces the need for an end user to tilt and twirl their head to try and find the direction of the strongest signal strength.

14 Claims, 5 Drawing Sheets

CELLULAR TELEPHONE HANDSET WITH INCREASED RECEPTION SENSITIVITY AND REDUCED TRANSMIT POWER LEVELS

BACKGROUND OF THE INVENTION

1. Field of the Invention

The present invention relates to a cellular telephone handset and, more particularly, to a cellular telephone handset with increased reception sensitivity and reduced transmit power levels.

2. Description of the Related Art

Cellular telephone handsets are well-known devices which are used to provide mobile communication. More recent cellular telephone handsets also include a GPS system, which can determine a 3D location of the handset. A GPS system determines its location by measuring the distance to a number of satellites based on signals received from the satellites.

Cellular telephone systems are well known for having weak spots where the received signal strength is very low and calls are frequently dropped. In addition, in a heavily urban environment, where many buildings can lie between the handset and the base station, the handset can receive a strong cell signal in one direction and a weak cell signal in another direction.

As a result, it is a common sight to see an end user on a cell phone call tilting and twirling their head to try and find the direction of the strongest signal strength of the cell phone call. This weak and inconsistent signal strength is a tremendous inconvenience to the end user. Thus, there is a need for a cellular telephone handset with increased reception sensitivity when operating in a poor signal strength environment.

DETAILED DESCRIPTION OF THE INVENTION

Figure 1:
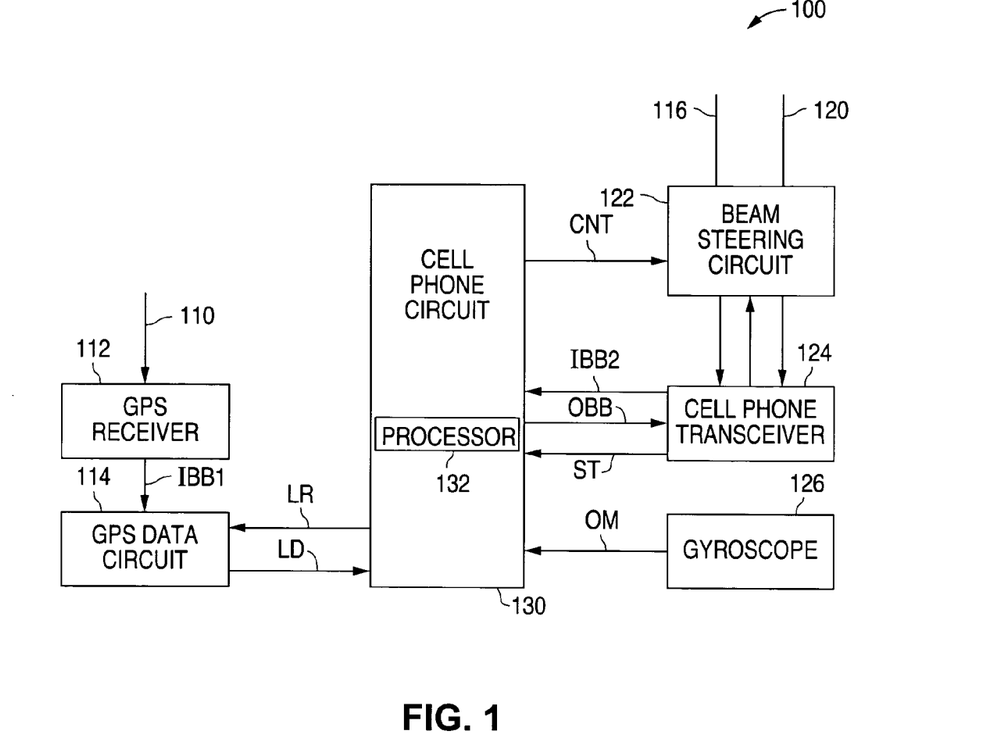
FIG. 1 is a block diagram illustrating an example of a cellular telephone handset 100 in accordance with the present invention.

FIG. 1 shows a block diagram that illustrates an example of a cellular telephone handset 100 in accordance with the present invention. As described in greater detail below, handset 100 utilizes an electrically-steered directional antenna to increase the received signal strength of handset 100, thereby reducing the need for an end user to tilt and twirl their head to try and find the direction of the strongest signal strength. In addition, handset 100 can utilize GPS position data to determine transmit signal levels, thereby reducing power consumption.

As shown in FIG. 1, handset 100 includes a GPS antenna 110 that receives electromagnetic waves, a GPS receiver 112 that is connected to antenna 110, and a GPS data circuit 114 that is connected to receiver 112. GPS receiver 112 receives incoming electromagnetic signals from antenna 110, down converts the signals, and filters the signals to generate an incoming base band signal IBB1.

GPS data circuit 114, in turn, receives the incoming base band signal IBB1, recovers a clock signal from the base band signal, and generates a data stream. GPS data circuit 114 examines the data stream and, when a pseudo-random code can be identified in the data stream, determines a distance to the source of the data stream, which in this case is a GPS satellite, based on the relative timing of the pseudo-random code.

In a conventional manner, GPS data circuit 114 also determines the distance to two or three more GPS satellites. Based on this information, GPS data circuit 114 determines a 3D location of GPS data circuit 114. GPS data circuit 114 begins examining the data stream for the pseudo-random code when a location request message LR is received, and outputs a location determined message LD that identifies the 3D location of GPS data circuit 114 once GPS data circuit 114 has determined the 3D location.

Referring again to FIG. 1, handset 100 also includes a first cell phone antenna 116 that receives and transmits electromagnetic waves at a first frequency, such as 800 MHz, and a second cell phone antenna 120 that receives and transmits electromagnetic waves at a second frequency, such as 1.8 or 1.9 GHz.

In addition, handset 100 includes a beam steering circuit 122 that is connected to antenna 116 and antenna 120. Beam steering circuit 122 receives a control signal CNT that controls the radiation pattern of antennae 116 and 120. Antenna 116 and antenna 120 can be individually set to have unidirectional radiation patterns, or can be used together so that an increased gain region can be pointed in a large number of directions to perform a search for the strongest source of a received signal.

As further shown in FIG. 1, handset 100 further includes a cell phone transceiver 124 that is connected to beam steering circuit 122. Transceiver 124 receives incoming electromagnetic signals from antenna 116 and antenna 120 via beam steering circuit 122, selects a signal, down converts the selected signal, and filters the signal to generate an incoming base band signal IBB2.

Transceiver 124 also receives an outgoing base band signal OBB, which can represent digitized speech, status, or data, up converts the signal to form a transmission signal, and outputs the transmission signal to antenna 116 or antenna 120 via beam steering circuit 122. In addition, transceiver 124 also outputs a received strength message ST that can indicate the strength of the signal received by antenna 116, antenna 120, or antennae 116 and 120 used together.

Handset 100 additionally includes a gyroscope 126 that outputs an orientation message OM which indicates how the present orientation of gyroscope 126 differs from a base orientation. Thus, as the end user moves handset 100, the orientation message OM from gyroscope 126 provides the information necessary to compensate for the movements.

Handset 100 further includes a cell phone circuit 130 that is connected to GPS receiver 112, GPS data circuit 114, beam steering circuit 122, transceiver 124, and gyroscope 126. Cell phone circuit 130 includes a processor 132, with an associated memory, that executes the steps of a number of methods.

In operation, cell phone circuit 130 receives the incoming base band signal IBB2 from transceiver 124, recovers a clock signal from the base band signal IBB2, and generates a data stream. In addition, circuit 130 examines the data stream and, when the data stream is addressed to handset 100, determines if an incoming call message or an outgoing call message has been detected. The incoming and outgoing call messages indicate that an incoming or an outgoing call is about to be established, and can be defined in a number of different ways.

For example, circuit 130 can detect an incoming call message when a ring message (which activates the cell phone ringer) is received from the base station. In addition, circuit 130 can detect an outgoing call message when the end user dials a telephone number. Alternately, to minimize power consumption, circuit 130 can detect an incoming call message or an outgoing call message only when the end user pushes the talk button to either answer a call or initiate a call.

When an incoming or outgoing call message is detected, circuit 130 sets antenna 116 and antenna 120 to have unidirectional antenna patterns when a data packet is to be received or transmitted. In addition, circuit 130 electrically steers the antennae during the gaps between successive data packets to collect signal strength information over a search area.

For example, cell phone circuit 130 can output the control message CNT to beam steering circuit 122 to search with a high gain region of the radiation pattern of antenna 116 and antenna 120 to determine a direction that points to the source of the strongest signal strength. Cell phone circuit 130 utilizes the orientation message OR from gyroscope 126 to determine the actual position.

Cell phone circuit 130 then examines the received strength messages ST from transceiver 124 to determine the signal strengths from the various directions. Once the signal strength messages ST from a number of directions have been collected, the search is complete and circuit 130 determines a direction to the source of the strongest signal strength.

After the direction to the source of the strongest signal strength has been determined, cell phone circuit 130 outputs the control message CNT to beam steering circuit 122 to steer cell phone antenna 116 and antenna 120 so that a high gain region points in the direction of the source of the strongest signal strength.

Antenna 116 and antenna 120 point to the direction of the source of the strongest signal strength when receiving, and can point to the direction of the source of the strongest signal strength when transmitting only when the direction does not pass through the end user or the power levels are within safe operating limits.

Further, after cell phone antenna 116 and antenna 120 have been steered to point at the source of the strongest signal strength, cell phone circuit 130 continues to search during the gaps between successive data packets until the call has ended to continually determine the direction that points to the source of the strongest signal strength. As a result, the end user receives the strongest possible signal strength without having to tilt and twist to try and find the signal.

Thus, cell phone circuit 130 generates the control message CNT, which utilizes the orientation message OR from gyroscope 126 to determine the actual position, to steer antenna 116 and 120 to conduct a search during the gaps. Once the search is complete, circuit 130 determines a direction to the strongest signal strength.

Following this, cell phone circuit 130 generates the control message CNT, which also utilizes the orientation message OR from gyroscope 126 to determine the actual position, to steer cell phone antenna 116 and antenna 120 to point in the direction of the strongest signal strength.

In addition, in the present invention, cell phone circuit 130 can minimize the transmit power levels. To minimize the levels, circuit 130 determines a 3D position of the handset and the base station. The 3D position of the handset can be determined by issuing the request location message RL to GPS data circuit 114, while the 3D position of the base station can be stored and retrieved from a memory location.

When the 3D positions have been determined, circuit 130 can determine first and second calculated transmit power levels based on the 3D positions of the handset and the base station. For example, circuit 130 can determine the first calculated transmit power level based on the distance between the handset and the base station, assuming that antenna 116 and antenna 120 can be pointed at the source of the strongest signal strength.

In addition, circuit 130 can determine the second calculated transmit power level based on the distance between the handset and the base station, assuming that antenna 116 and antenna 120 have unidirectional antenna patterns. Thus, if handset 100 is close to a base station, circuit 130 can reduce the transmit power levels, thereby saving power. In addition, more power can be saved if antenna 116 and antenna 120 can point to the source of the strongest signal strength.

Further, cell phone circuit 130 can limit the number of searches that are conducted, thereby saving additional power, by first determining a 3D position of handset 100. Following this, circuit 130 can consult a digital map stored in the memory associated with processor 132 to determine the direction and transmit power levels that are associated with the 3D position. As long as the received signal strength remains within an expected range, cell phone circuit 130 need only consult the digital map stored in memory.

If the received signal strength falls below the expected range, or if the digital map lacks an entry for a position, cell phone circuit 130 searches for the direction of the strongest signal strength, determines the transmit power levels, and then makes an entry in the digital map. Thus, cell phone circuit 130 can create a digital map if one does not exist.

Figure 2:
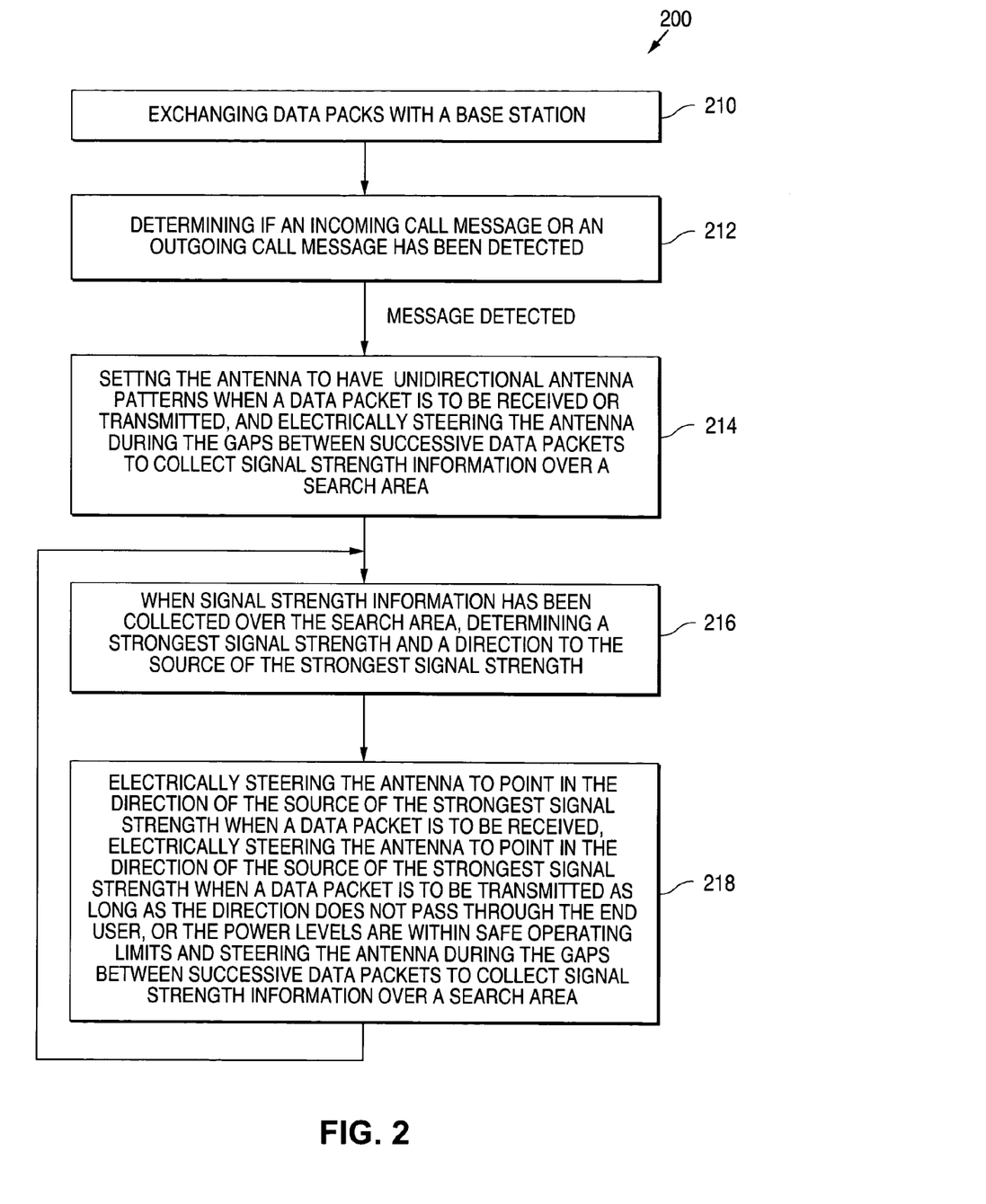
FIG. 2 is a flow chart illustrating an example of a method 200 of operating a cell phone circuit in accordance with the present invention.

FIG. 2 shows a flow chart that illustrates an example of a method 200 of operating a cell phone circuit in accordance with the present invention. As shown in FIG. 2, method 200 begins at step 210 by exchanging data packets with a base station. For example, when handset 100 is turned on, handset 100 and the base station exchange status and control data packets.

Following this, method 200 moves to step 212 to determine if an incoming call message or an outgoing call message has been detected. As above, the incoming and outgoing call messages indicate that an incoming or an outgoing call is about to be established, and can be defined in the same ways as noted above.

When an incoming call message or an outgoing call message is detected, method 200 moves to step 214 to set the antenna to have unidirectional antenna patterns when a data packet is to be received or transmitted. In method 200, the term "antenna" refers to a group of antenna which can be operated individually with unidirectional antenna patterns, or as a group as a directional antenna. In addition, method 200 electrically steers the antenna during the gaps between successive data packets to collect signal strength information over a search area.

Method 200 performs the search by electrically steering a high gain region of the radiation pattern of antenna 116 and antenna 120 to a number of different positions, and determining the received signal strength ST at the different positions. Further, the search utilizes the orientation message OM output by gyroscope 126 to define a current position relative to a base position. For example, cell phone circuit 130 can command beam steering circuit 122 via the control signal CNT to search for a direction that points to the source of the strongest signal strength of the cell phone call.

Method 200 can follow any number of search patterns. For example, method 200 can begin with a spherical search, limit most subsequent searches to the region surrounding the source of the strongest signal strength, and then only periodically conduct a broader search.

When signal strength information has been collected over the search area in step 214, method 200 moves to step 216 to determine both a strongest signal strength and a direction to the source of the strongest signal strength using the received signal strength information collected during the search.

Following this, method 200 moves to step 218 to electrically steer the antenna to point in the direction of the source of the strongest signal strength when a data packet is to be received. For example, cell phone circuit 130 can command beam steering circuit 122 via the control signal CNT to point cell phone antenna 116 and antenna 120 in the direction of the source of the strongest signal strength of the cell phone call. As a result, the end user receives the strongest possible signal strength without having to tilt and twist to try and find the signal.

In addition, method 200 also electrically steers the antenna to point in the direction of the source of the strongest signal strength when a data packet is to be transmitted as long as the direction does not pass through the end user or the power levels are within recognized safe operating limits. Otherwise, method 200 sets the antenna to have unidirectional antenna patterns when a data packet is to be transmitted. Further, method 200 steers the antenna during the gaps between successive data packets to again collect signal strength information over a search area.

When the signal strength information has been collected over the search area, method 200 returns to step 216. Method 200 then continues to loop until the cell phone call has ended. (In addition, method 200 can optionally introduce a delay before returning to step 216 to reduce the number of times that a search is conducted during a call.)

Thus, once method 200 determines the direction to the source of the strongest signal strength, method 200 continues to search to determine the direction to the source of the strongest signal strength which, in turn, allows the antenna to be continually directed to the source of the strongest signal strength.

Figure 3:
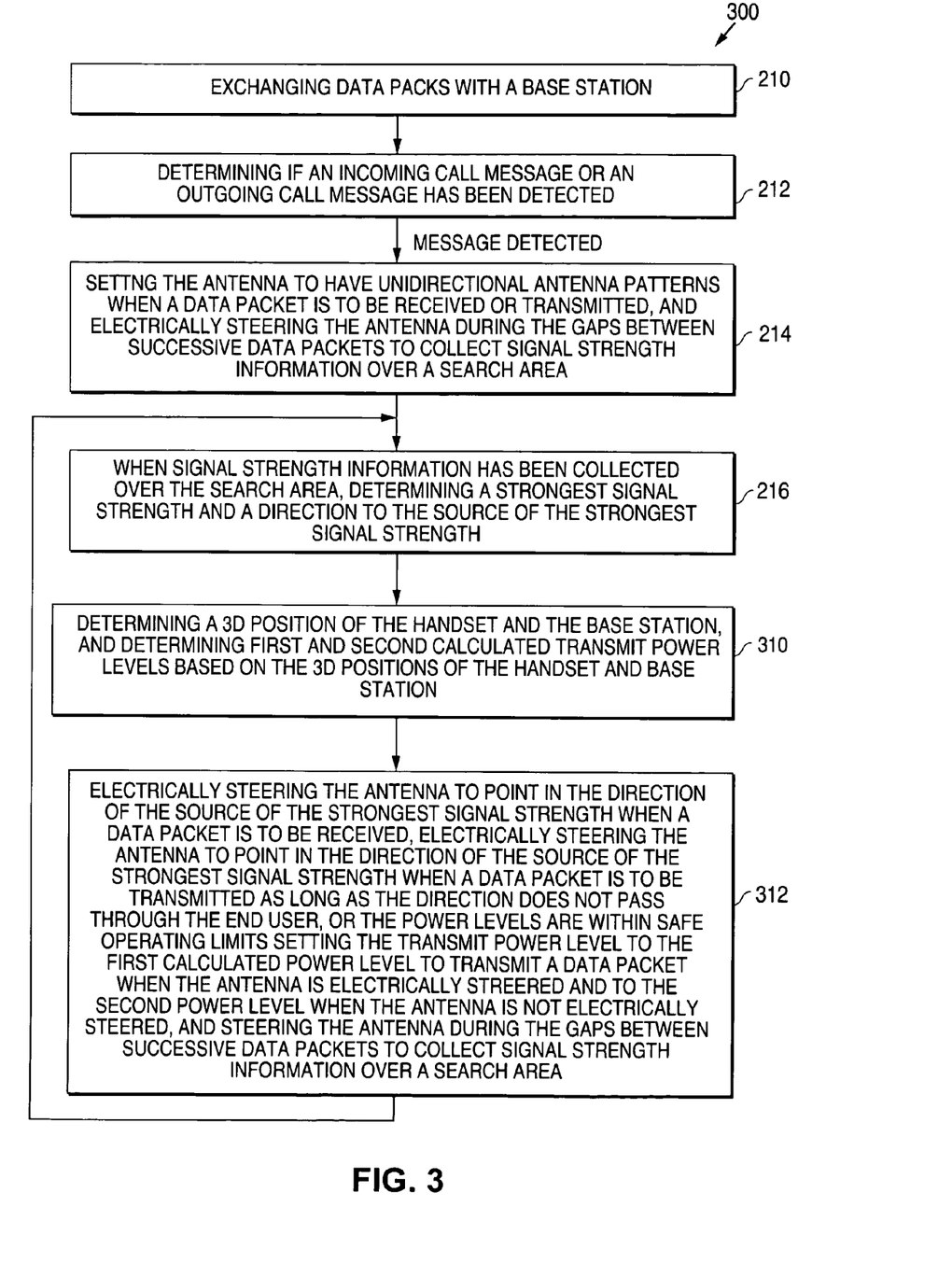
FIG. 3 is a flow chart illustrating an example of a method 300 of operating a cell phone circuit in accordance with a first alternate embodiment of the present invention.

FIG. 3 shows a flow chart that illustrates an example of a method 300 of operating a cell phone circuit in accordance with a first alternate embodiment of the present invention. Method 300 reduces the transmit power, and begins in the same manner as method 200. As a result, method 300 utilizes the same reference numerals as method 200 to designate the steps which are common to both methods.

As shown in FIG. 3, method 300 and method 200 are the same up through step 216, where the strongest signal strength and a direction to the source of the strongest signal strength are determined. Following this, method 300 moves to step 310 to determine a 3D position of the handset and the base station. The 3D position of the handset can be determined via commands to a GPS data circuit, such as GPS data circuit 114, while the 3D position of the base station can be stored and retrieved from a memory location.

Further, method 300 can determine first and second calculated transmit power levels based on the 3D positions of the handset and the base station. For example, method 300 can determine the first calculated transmit power level based on the distance between the handset and the base station, assuming that the antenna can be pointed at the source of the strongest signal strength. In method 300, the term "antenna" refers to a group of antenna which can be operated individually with unidirectional antenna patterns, or as a group as a directional antenna.

In addition, method 300 can determine the second calculated transmit power level based on the distance between the handset and the base station, assuming that the antenna can not be pointed at the source of the strongest signal strength, but instead is limited to unidirectional antenna patterns.

In addition, method 300 can optionally use the received signal strength to further determine the first and second calculated transmit power levels. For example, based on the distance between the handset and the base station, and the base station transmit signal strength (which can be a fixed value or communicated to the handset in a control packet), method 300 can determine how the received signal strength varies from a predicted value, and then adjust the first and second calculated transmit power levels as needed.

Thus, if an obstacle lies between the handset and the base station which would attenuate the signal, the handset can detect this condition by evaluating the received signal strength against a predicted value, and then increasing (or decreasing) the first and second calculated transmit power levels based on the difference between the received signal strength and the predicted value.

Once the first and second calculated transmit power levels have been determined, method 300 moves to step 312 to electrically steer the antenna to point in the direction of the source of the strongest signal strength when a data packet is to be received. In addition, method 300 electrically steers the antenna to point in the direction of the source of the strongest signal strength when a data packet is to be transmitted as long as the direction does not pass through the end user or the power levels are within recognized safe operating limits. Otherwise, method 300 sets the antenna to have unidirectional antenna patterns when a data packet is to be transmitted.

Further, method 300 sets the transmit power level to the first calculated power level to transmit a data packet when the antenna is electrically steered, and to the second power level when the antenna is not electrically steered. Method 300 additionally steers the antenna during the gaps between successive data packets to collect signal strength information over a search area and, when the search is complete, returns to step 216. Method 300 then continues to loop until the cell phone call has ended. (In addition, method 300 can optionally introduce a delay before returning to step 216 to reduce the number of times that the 3D position is determined and a search is conducted during a call.)

Thus, method 300 combines the positional information from the GPS data circuit with the increased received signal strength that comes from a directional antenna to set the transmit power to the lowest level. For example, when the handset is close to a base station, knowledge of the relative positions from the GPS positional information allows the transmit power level to be significantly reduced.

In addition, when a high gain pattern of the antenna can be pointed at the source of the strongest signal strength, the transmit power level can be further reduced. As a result, method 300 allows the antenna to be continually directed to the source of the strongest signal strength while minimizing transmit power.

Figure 4A:
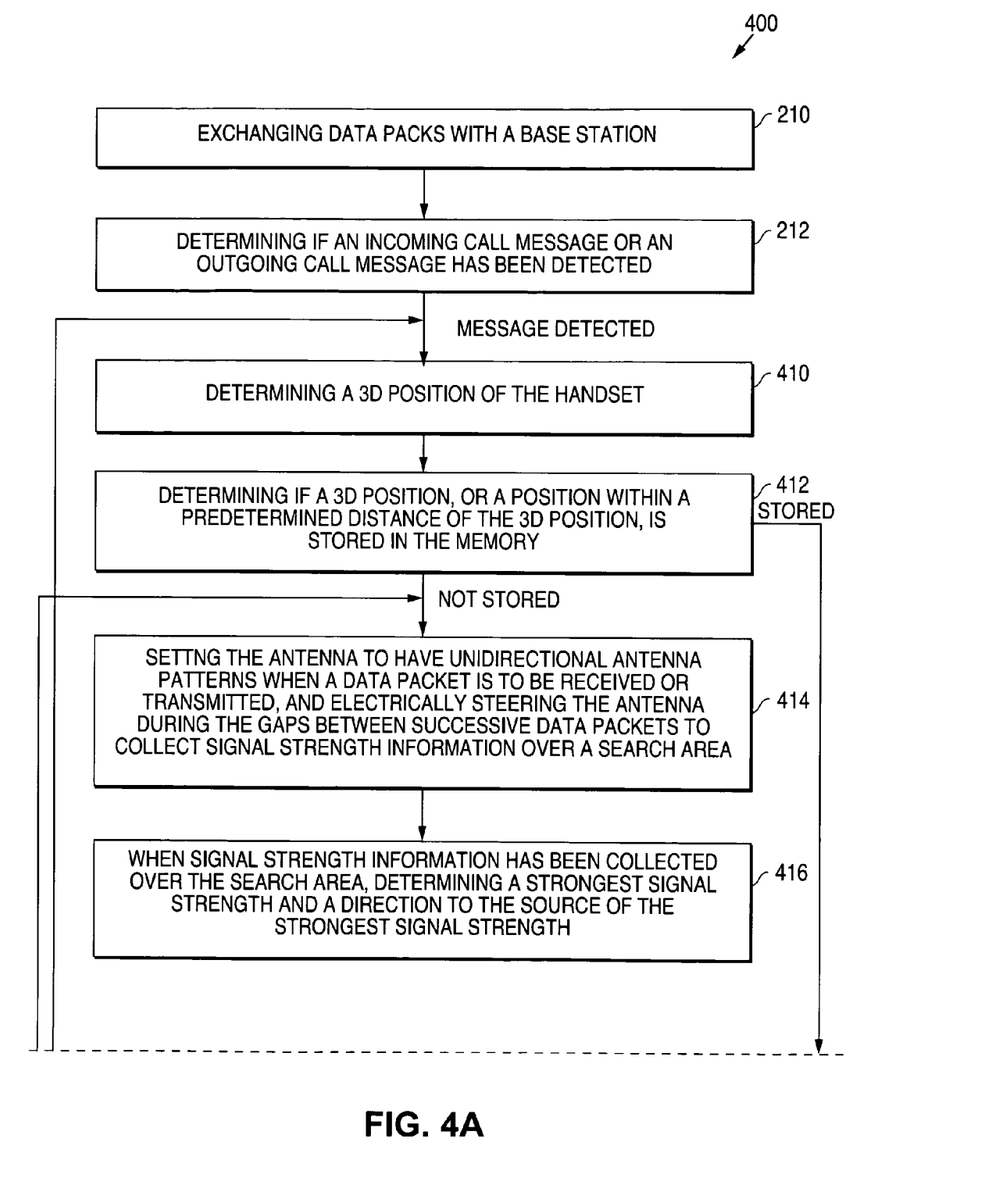
FIG. 4 is a flow chart illustrating an example of a method 300 of operating a cell phone circuit in accordance with a second alternate embodiment of the present invention.
Figure 4B:
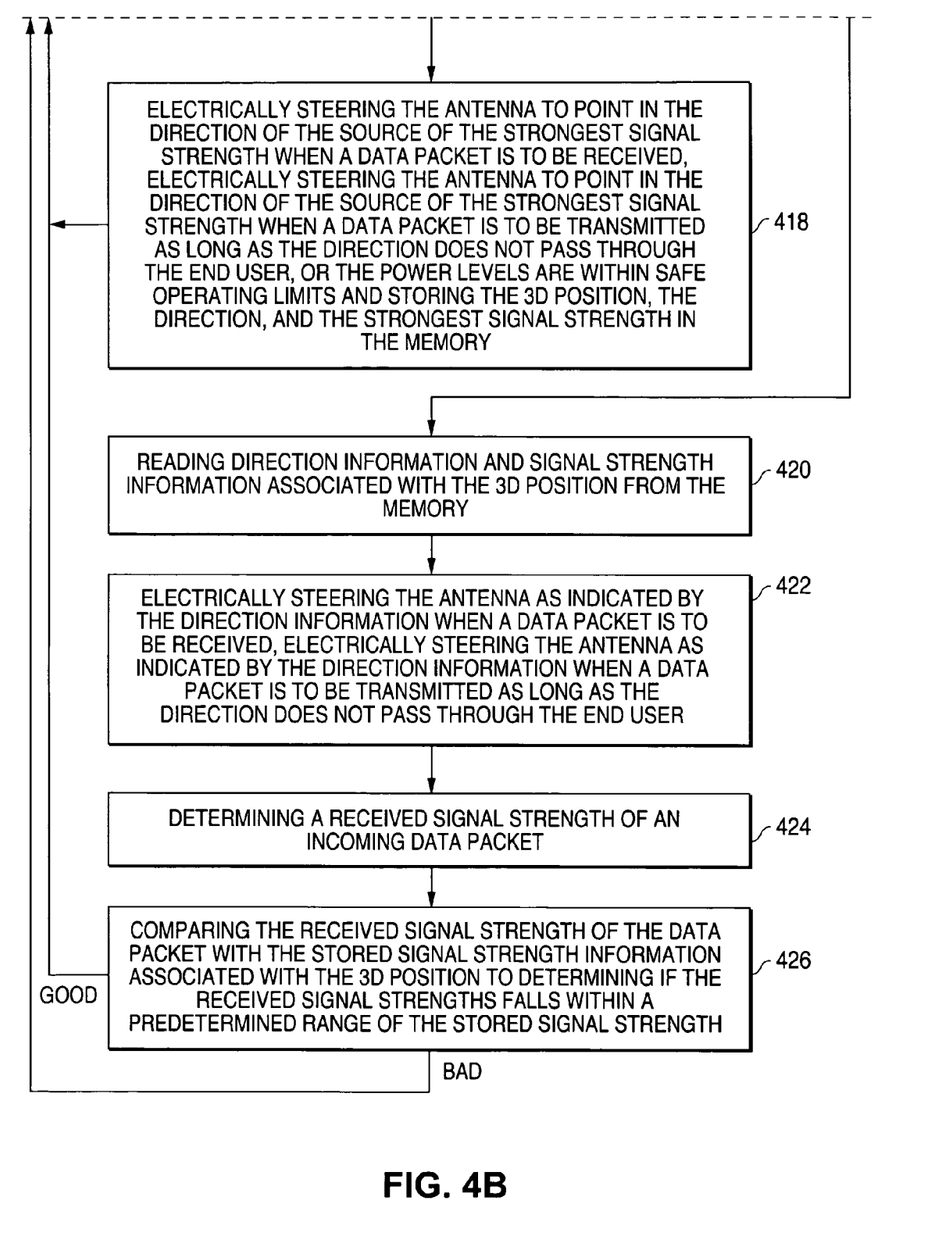

FIG. 4 shows a flow chart that illustrates an example of a method 400 of operating a cell phone circuit in accordance with a second alternate embodiment of the present invention. Method 400 reduces the transmit power and the number of searches that are made, and begins in the same manner as method 200. As a result, method 400 utilizes the same reference numerals as method 200 to designate the steps which are common to both methods.

As shown in FIG. 4, method 400 and method 200 are the same up through step 212, where an incoming call message or an outgoing call message is detected. When a message is detected, method 400 moves to step 410 to determine a 3D position of the handset. As above, the 3D position of the handset can be determined via a location request command to a GPS data circuit, such as GPS data circuit 114. Next, method 400 moves to step 412 to determine whether the 3D position, or a position within a predetermined distance of the 3D position, is stored in the memory, such as the memory associated with processor 132.

When the 3D position or a nearby position is not stored in the memory, method 400 moves to step 414 to set the antenna to have unidirectional antenna patterns when a data packet is to be received or transmitted. In method 400, the term "antenna" refers to a group of antenna which can be operated individually with unidirectional antenna patterns, or as a group as a directional antenna. In addition, method 400 electrically steers the antenna during the gaps between successive data packets to collect signal strength information over a search area.

Method 400 performs the search by electrically steering a high gain region of the radiation pattern of antenna 116 and antenna 120 to a number of different positions, and determining the received signal strength ST at the different positions. Further, the search utilizes the orientation message OM output by gyroscope 126 to define a current position relative to a base position. For example, cell phone circuit 130 can command beam steering circuit 122 via the control signal CNT to search for a direction from antenna 116 and antenna 120 that points to the source of the strongest signal strength of the cell phone call. Method 400 can follow any number of search patterns. For example, method 400 can begin with a spherical search, limit most subsequent searches to the region surrounding the source of the strongest signal strength, and then only periodically conduct a broader search.

When signal strength information has been collected over the search area in step 414, method 400 moves to step 416. In step 416, method 400 determines both a strongest signal strength and a direction to the source of the strongest signal strength using the received signal strength information collected during the search.

Following this, method 400 moves to step 418 to electrically steer the antenna to point in the direction of the source of the strongest signal strength when a data packet is to be received. For example, cell phone circuit 130 can command beam steering circuit 122 via the control signal CNT to point cell phone antenna 116 and antenna 120 in the direction of the source of the strongest signal strength of the cell phone call. As a result, the end user receives the strongest possible signal strength without having to tilt and twist to try and find the signal.

In addition, method 400 electrically steers the antenna to point in the direction of the source of the strongest signal strength when a data packet is to be transmitted as long as the direction does not pass through the end user, or the power levels are within recognized safe operating limits. Otherwise, method 400 sets the antenna to have unidirectional antenna patterns when a data packet is to be transmitted.

Further, method 400 stores the 3D position, the strongest received signal strength, and the direction to the source of the strongest signal strength in the memory, and then returns to step 410. (Method 400 can optionally introduce a delay before returning to step 410 to reduce the number of times that the 3D position is determined during a call.)

Thus, when the 3D position of the handset or a nearby position is not stored in the memory, method 400 determines the strongest signal strength and the direction to strongest signal strength, electrically steers the antenna in the direction of the strongest signal strength, and makes an entry in the memory. Thus, over time, method 400 creates a digital map of frequently traveled routes that indicates the strongest signal strength and the direction to the strongest signal strength at a large number of points along the routes.

Returning to step 412, when method 400 determines that the 3D position of the handset or a nearby position is stored in the memory, method 400 moves to step 420 to read direction information and signal strength information that is associated with the 3D position from the memory.

Following this, method 400 moves to step 422 to electrically steer the antenna as indicated by the direction information when a data packet is to be received. In addition, method 400 electrically steers the antenna as indicated by the direction information when a data packet is to be transmitted as long as the direction does not pass through the end user, or the power levels are within recognized safe operating limits. Otherwise, method 400 sets the antenna to have unidirectional antenna patterns when a data packet is to be transmitted.

After this, method 400 moves to step 424 to determine the received signal strength of an incoming data packet. Following this, method 400 moves to step 426 to compare the received signal strength of the incoming data packet with the stored signal strength that is associated with the 3D position to determine if the received signal strength falls within a predetermined range of the stored signal strength. For example, cell phone circuit 130 can compare the received strength message ST output by transceiver 124 with a stored value to determine if the received signal strength falls within the predetermined range.

If the received signal strength of the incoming data packet falls within the predetermine range of the stored signal strength that is associated with the 3D position, the received signal strength is considered good. In this case, method 400 returns to step 410 to determine a new position of the handset. Thus, as long as the received signal strength remains strong, method 400 continues to loop until the cell phone call has ended. (Method 400 can optionally introduce a delay before returning to step 410 to reduce the number of times that the 3D position is determined during a call.)

On the other hand, when the received signal strength of the incoming data packet is outside of the predetermined range of the stored signal strength that is associated with the 3D position, the received signal strength is considered bad. In this case, method 400 returns to step 414 to determine a direction to the source of the strongest signal strength.

The data stored in the memory can be maintained in a number of ways. For example, when a 3D position and the associated signal strength and direction information is stored in the memory, the 3D position and the associated signal strength information can be deleted from the memory if the information is not accessed within a predefined period of time, such as two months.

Thus, method 400 generates a digital map of frequently traveled routes that indicates the strongest signal strength and the direction to the strongest signal strength for a large number of points along the routes. Once the digital map has been created, it is no longer necessary to search unless the received signal strength falls below a threshold value and is declared bad in step 426.

Further, method 400 can determine first and second calculated transmit power levels, as in step 310, between steps 412 and 414, and store these values in the memory with the associated 3D position. In this case, method 400 determines a 3D location, and looks up the strongest signal strength, the direction to the source of the strongest signal strength and the transmit power levels without needing to perform a search.

Alternately, regional maps, which include signal strength, direction, and transmit power levels for a large number of locations throughout the region, particularly spots where coverage is weak and calls are frequently dropped, can be generated independently and stored in memory.

In either case, method 400 need only perform a search when the received signal strength falls below the threshold value and is declared bad in step 426, thereby saving the power required to perform the searches. Further, if independently developed regional maps sufficiently cover the area, the search feature of method 400 can be eliminated, thereby relying completely on the stored direction and transmit power level data.

Figure 5:
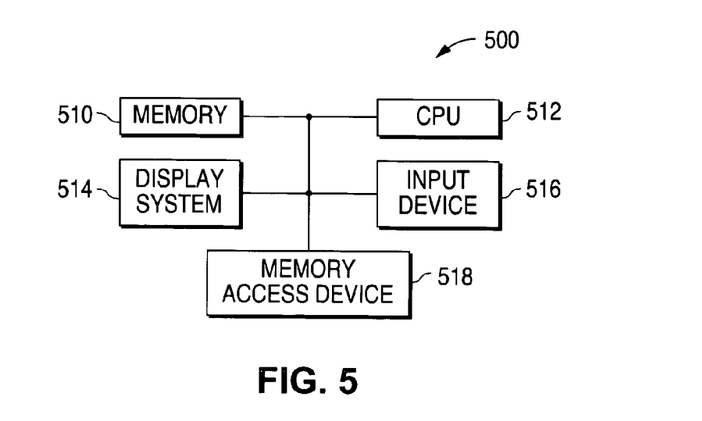
FIG. 5 is a block diagram illustrating an example of processor 500 in accordance with the present invention.

FIG. 5 shows a block diagram that illustrates an example of a processor 500 in accordance with the present invention. Processor 500, which can represent processor 132, executes software that can implement methods 200, 300, and 400 of the present invention. As shown in FIG. 5, processor 500 includes a memory 510 and a central processing unit (CPU) 512 that is connected to memory 510. Memory 510 stores data, such as the digital map, an operating system, and a set of program instructions. The operating system can be implemented with, for example, the Linux operating system, although other operating systems can alternately be used. The program instructions can be written in, for example, C++ although other languages can alternately be used.

CPU 512, which can be implemented with, for example, a 32-bit machine, operates on the data in response to the program instructions. Although only one processor is described, the present invention can be implemented with multiple processors in parallel to increase the capacity to process large amounts of data.

In addition, processor 500 can include a display system 514 that is connected to CPU 512. Display system 514, which can be remotely located, allows images to be displayed to the user which are necessary for the user to interact with the program. Processor 500 also includes a user-input system 516 which is connected to CPU 512. Input system 516, which can be remotely located, allows the user to interact with the program.

Further, processor 500 includes a memory access device 518, such as a networking circuit, which is connected to memory 510 and CPU 512. Memory access device 518 allows the processed data from memory 510 or CPU 512 to be transferred to an external medium, such as a networked computer. In addition, device 518 allows the program instructions to be transferred to memory 510 from the external medium.

Thus, the present invention provides a handset that utilizes a directional antenna to increase the received signal strength, and a GPS data circuit to determine a minimum transmit power level. As a result, the present invention reduces the need for an end user to tilt and twirl their head to try and find the direction of the strongest signal strength, while at the same time significantly increasing battery life.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of operating a handset, the method comprising:
   determining if an incoming call message or an outgoing call message has been detected;
   determining a 3D position of the handset after an incoming call message or an outgoing call message has been detected;
   determining whether a direction from the 3D position of the handset to a strongest signal from a source is stored in a memory;
   electrically steering an antenna pattern over a search area to collect signal strength information when a direction to the strongest signal from the source is not stored in the memory;
   determining the direction to the strongest signal from the source after signal strength information from the search area has been collected; and
   storing the 3D position of the handset and the direction to the strongest signal from the source in the memory after the direction to the strongest signal from the source has been determined.

2. The method of claim 1 and further comprising:
   reading the direction from the 3D position of the handset to the strongest signal from the source from the memory when the direction from the 3D position of the handset to the strongest signal from the source is stored in the memory; and
   electrically steering the antenna pattern to point in the direction from the 3D position of the handset to the strongest signal from the source read from the memory.

3. The method of claim 2 and further comprising reading a stored signal strength from the memory when the direction from the 3D position of the handset to the strongest signal from the source is stored in the memory.

4. The method of claim 3 and further comprising determining a received signal strength of an incoming data packet when the antenna pattern is pointed in the direction from the 3D position of the handset to the strongest signal from the source.

5. The method of claim 4 and further comprising comparing the received signal strength with the stored signal strength.

6. The method of claim 5 and further comprising determining a new direction to the strongest signal from the source when the received signal strength is less than the stored signal strength.

7. A handset comprising:
   a first antenna;
   a second antenna;
   a beam steering circuit connected to the first antenna and the second antenna; and
   a cell phone unit connected to the beam steering circuit, the cell phone unit to:
      determine if an incoming call message or an outgoing call message has been detected;
      determine a 3D position of the handset after an incoming call message or an outgoing call message has been detected;
      determine whether a direction from the 3D position of the handset to a strongest signal from a source is stored in a memory;
      command the beam steering circuit to electrically steer an antenna pattern over a search area to collect signal strength information when a direction to the strongest signal from the source is not stored in the memory;
      determine the direction to the strongest signal from the source after signal strength information from the search area has been collected; and
      stores the 3D position of the handset and the direction to the strongest signal from the source in the memory after the direction to the strongest signal from the source has been determined.

8. The handset of claim 7 wherein the cell phone unit:
reads the direction from the 3D position of the handset to the strongest signal from the source from the memory when the direction from the 3D position of the handset to the strongest signal from the source is stored in the memory; and
commands the beam steering circuit to electrically steer the antenna pattern to point in the direction from the 3D position of the handset to the strongest signal from the source read from the memory.

9. The handset of claim 8 wherein the cell phone unit reads a stored signal strength from the memory when the direction from the 3D position of the handset to the strongest signal from the source is stored in the memory.

10. The handset of claim 9 wherein the cell phone unit determines a received signal strength of an incoming data packet when the antenna pattern is pointed in the direction from the 3D position of the handset to the strongest signal from the source.

11. The handset of claim 10 wherein the cell phone unit compares the received signal strength with the stored signal strength.

12. The handset of claim 11 wherein the cell phone unit determines a new direction to the strongest signal from the source when the received signal strength is less than the stored signal strength.

13. A method of operating a handset, the method comprising:
determining if an incoming call message or an outgoing call message has been detected;
determining a 3D position of the handset after an incoming call message or an outgoing call message has been detected;
determining whether a direction from a location to a strongest signal from a source is stored in a memory, the location lying within a predetermined distance from the 3D position of the handset;
electrically steering an antenna pattern over a search area to collect signal strength information when the direction from the location to the strongest signal from the source is not stored in the memory;
determining a direction from the 3D position of the handset to the strongest signal from the source after signal strength information from the search area has been collected; and
storing the 3D position of the handset and the direction from the 3D position of the handset to the strongest signal from the source in the memory after the direction from the 3D position of the handset to the strongest signal from the source has been determined.

14. The method of claim 13 and further comprising:
reading the direction from the location to the strongest signal from the source from the memory when the direction from the location to the strongest signal from the source is stored in the memory; and
electrically steering the antenna pattern to point in the direction from the location to the strongest signal from the source read from the memory.

* * * * *

UNITED STATES PATENT AND TRADEMARK OFFICE
CERTIFICATE OF CORRECTION

PATENT NO.       : 7,996,034 B1
APPLICATION NO.  : 11/046024
DATED            : August 9, 2011
INVENTOR(S)      : Visvamohan Yegnashankaran et al.

It is certified that error appears in the above-identified patent and that said Letters Patent is hereby corrected as shown below:

Claim 7, line 23, delete "stores the 3D position" and replace with --store the 3D position--.

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,996,034 B1 |
| APPLICATION NO. | : 11/046024 |
| DATED | : August 9, 2011 |
| INVENTOR(S) | : Visvamohan Yegnashankaran et al. |

It is certified that error appears in the above-identified patent and that said Letters Patent is hereby corrected as shown below:

Column 10, line 64 (Claim 7, line 23) delete "stores the 3D position" and replace with --store the 3D position--.

This certificate supersedes the Certificate of Correction issued October 11, 2011.

Signed and Sealed this
Eighth Day of November, 2011

David J. Kappos
*Director of the United States Patent and Trademark Office*